United States Patent Office 2,950,104
Patented Aug. 23, 1960

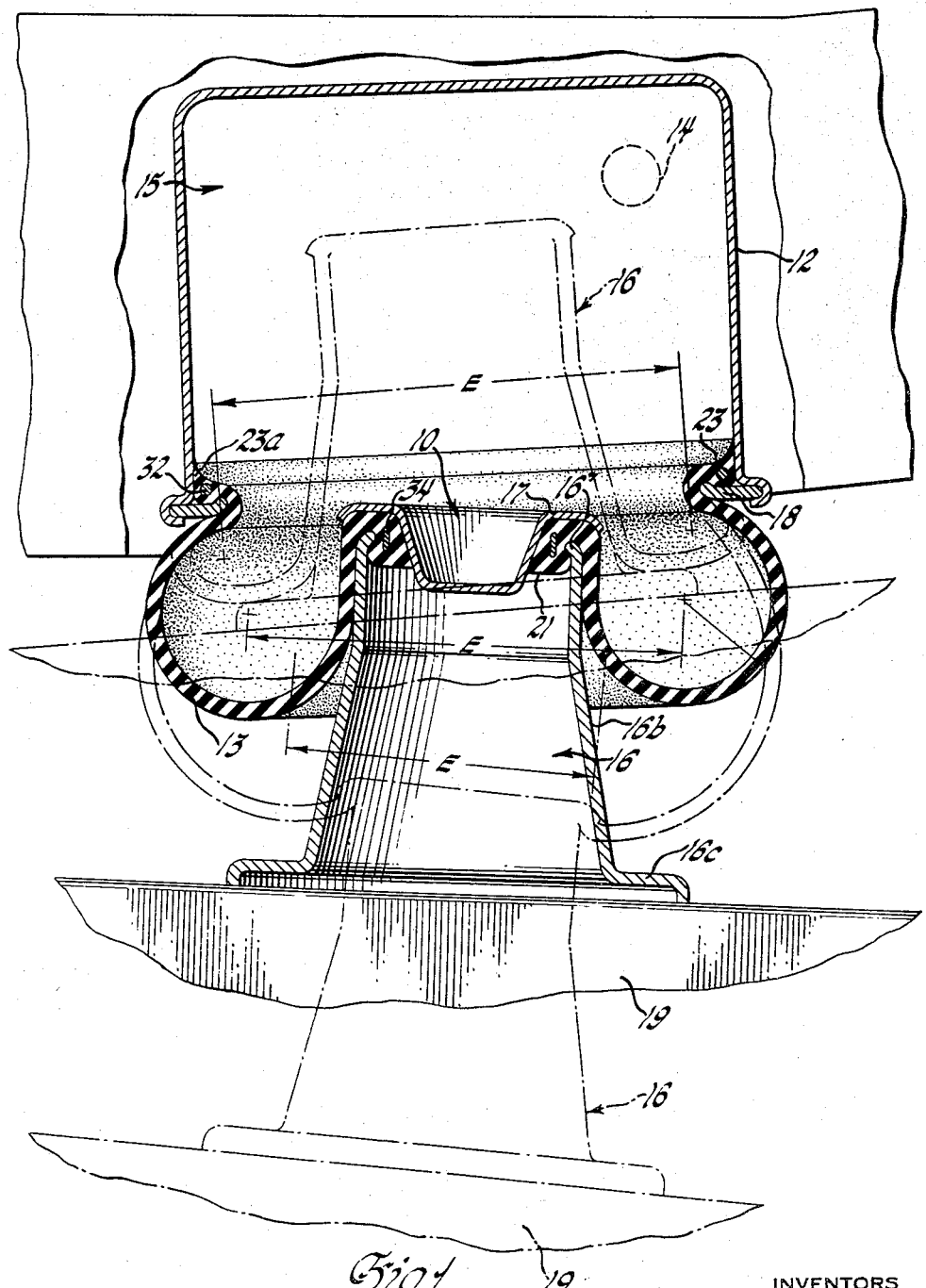

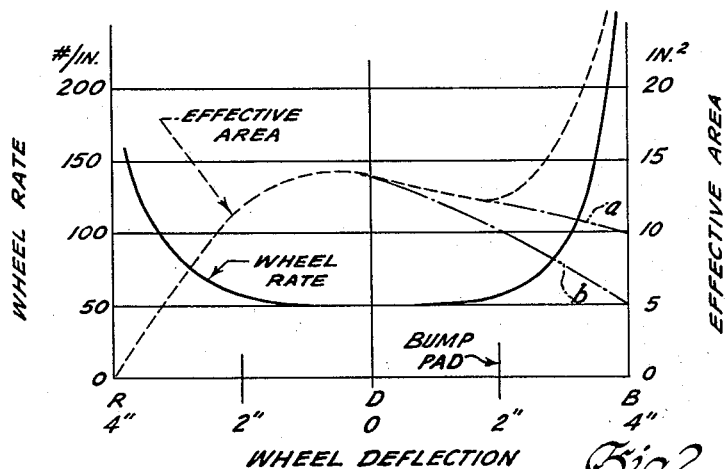
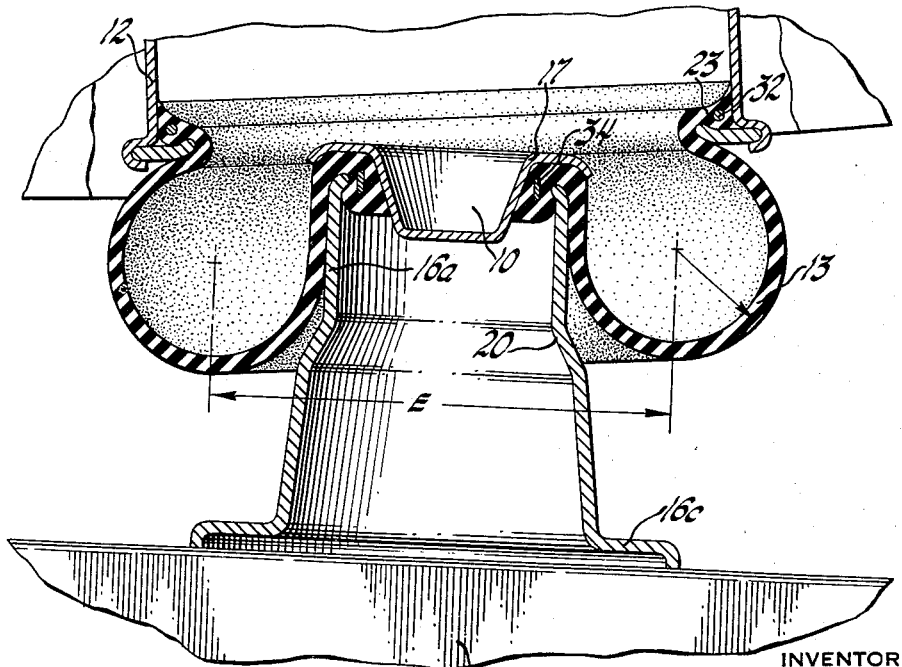

2,950,104

AIR SPRING

Phillip C. Bowser, St. Clair Shores, and Richard E. Denzer, East Detroit, Mich., assignors to General Motors Corporation, Detroit, Mich., a corporation of Delaware Filed Apr. 20, 1956, Ser. No. 579,545

4 Claims. (Cl. 267—65)

This invention relates to an air spring of novel construction and operation and in its most specific aspect concerns such a spring as applied to automotive vehicles.

An air spring of the type here involved differs from the air springs in current use on heavy passenger vehicles (see U.S. Patent 2,691,420 to Fox et al.; also GM Engineering Journal, vol. 1, No. 2, September-October 1953, page 40) in that the flexible component thereof, while possessing a measure of strength in the sense of being to some extent self-supporting, is formed to assume only a single convolution and in that the same is provided with bead rings of different diameters, necessary in view of the telescopic disposition assumed by the associated air reservoir and piston on the compression stroke of the latter. As a consequence of this telescopic disposition of the rigid members on the compression stroke of the piston, the spring bears some relation to so-called diaphragm air springs as shown, for example, in U.S. Patent 1,094,567, but springs of the latter category are otherwise substantially different. Thus the diaphragm is essentially only a sealing member and is for the most part supported by the mutually adjacent walls of the piston and reservoir.

A principal fault of the single convolution spring as heretofore constructed resides in the fact that it affords insufficient resistance to "bottoming," i.e. abrupt contact of the vehicle body and axle. Our invention aims to alleviate this condition and in particular to provide such a spring which in operation displays improved rate (stiffness) characteristics through its compression stroke, with a relatively abrupt increase in its rate near the end of the stroke.

Other objects and features of the invention will become apparent from the following description going to a preferred embodiment thereof. The description will proceed with reference to the accompanying drawings in which Fig. 1 shows the air spring assembly partly in section and partly in elevation, Fig. 2 is a graph illustrating the characteristics of the spring; and Fig. 3 shows a modified form of one of the significant parts of the assembly.

In the drawing, the numeral 10 generally denotes the piston component of the spring, 12 the reservoir component, and 13 the flexible member. Secured to the reservoir component, which on installation of the spring is affixed to the frame or body of the vehicle, is a fixture 14 opening to the reservoir and adapted to be connected to a hose line or the equivalent extending to a source of air supply as a tank, not shown, served by an air compressor powered by the engine of the vehicle. If desired, an expansion tank or container may be interposed in the line between the fixture and the supply tank to increase the reservoir capacity.

It will be appreciated that four of the springs as represented are normally used, each located approximately at a corner of the vehicle—assuming a conventional passenger car installation.

Piston 10 is comprised of a flanged cup element 17 disposed over a tubular pedestal 16 through which the piston is connected by welding or in any other suitable way to a member 19 subjected to the oscillations yieldingly absorbed by the spring, e.g. lower control arm, swing arm, etc. The end 16′ of the pedestal is inwardly turned and rounded to facilitate its being snappingly engaged by the lower bead ring 21 of member 13.

Reservoir 12 will be seen as formed at its open end to crimpingly embrace the outer edge of a ring piece 18 which affords a seat for the upper bead ring 23 of the flexible member 13. In addition to seating the bead ring, the ring piece 18 acts to lend strength to the reservoir shell thereby allowing for the use of relatively inexpensive thin gauge metal in the fabrication of the shell.

Although the cup 17 may be otherwise sealingly joined to the lower bead ring 21, it is preferably bonded to the bead ring incident to the molding and curing of the flexible member. Dependency is placed on the air pressure within the reservoir 12 to maintain the seal at the upper bead ring 23. The latter will be observed as comprising a flexible tapered lip 23a desirably formed to an outer diameter slightly exceeding the internal diameter of the reservoir wall where the sealing occurs.

Metal rings 32 and 34 of which the former is preferably fabricated of solid metal rather than an assemblage of wires, for example, provide anchorage for nylon or other cords reinforcing the flexible member. The cord disposition and distribution is varied, of course, as determined by the points of maximum strain. The spring action proceeds with little if any stretching of the flexible member.

Reverting now to the tubular pedestal 16, it will be seen that the same is formed with a tapered wall 16b and that it comprises a flange 16c through which the connection with the arm 19 is effected.

Operation of the spring is marked by up and down movement of the piston 10, pedestal 16, and arm 19, the upward movement being resisted by the increasing pressure of the air within the chamber 15. In the drawing (Fig. 1), dot and dash lines are employed to indicate the upper and lower positions of the identified parts, while the solid line representation illustrates the relative relation thereof under static load.

The effective area of the piston varies depending upon its position relative to the reservoir, gradually increasing (Fig. 2) as the piston is restored to its static load mid-position from its position at maximum rebound. In this graph, wheel deflections are plotted as abscissae, effective piston areas and wheel rates as ordinates. R refers to the position of the piston at maximum rebound, while B connotes the full bump position of the piston.

On the compression stroke of the piston, to continue with Fig. 2, a slight falling off of the effective area thereof occurs and continues until the flexible member begins to engage the lower portion of the tapered wall of the pedestal, whereafter the effective area of the piston begins to increase. The abrupt increase in effective piston area reflected by the upturned portion of the curve, results from engagement of the flexible member with the flange 16c.

Dotted line b in Figure 2 shows the change in effective area of a piston mounted over a cylindrical pedestal without a tapered portion, while dotted line a illustrates the effective area changes obtaining where there is a tapered portion but no provision for engagement of the flexible member with a bump pad or the equivalent.

The tapered wall of the piston, apart from flattening out the curve between the static mid-load position and the bump pad position, operates to smooth the transition at the 2" deflection point. In general it may be said that small ride motions occur on the relatively flat portion of the effective area curve and that larger motions encounter an increasing rate (stiffness) build up so that there is no jolting "crash through" as the limit of travel is reached.

As shown by Fig. 2, a very desirable wheel rate curve is obtainable according to the invention. Wheel rate is defined as load change divided by change of deflection, the units normally being pounds and inches. Such a curve may be readily developed in a manner well known in the art from a load deflection curve obtained by actual measurements made using standard dynamic equipment.

In Fig. 1 the lines E indicate the diameter of the effective area of the piston in its three positions shown. The length of each of these lines is the distance between the centers of the circles prescribed in part by the convolutions of the flexible member at opposed sides of the pedestal.

It will be appreciated that the characteristics of the spring may be very substantially varied by elevating or lowering the bump pad, i.e. flange 16c; also, that variations in the characteristics of the spring may be readily achieved by varying the shape of the pedestal. In this connection, reference is made to Fig. 3 in which the pedestal 16a, instead of having a progressive even taper, is outwardly distorted beginning at point 20. Such a design has the effect of forestalling the slight drop in the effective area curve (Fig. 2) beyond the static mid-load position and is desirable in certain installations. In general, by proper positioning of the bump pad and/or the use of a properly distorted pedestal substantially any spring rate characteristic considered as desirable may be attained.

Having thus described and illustrated our invention what we claim is:

1. In an air spring comprising a reservoir component and a piston component with a flexible member therebetween, said reservoir component being designed to telescopically receive said piston component, said piston component including a pedestal element adapted to be connected to an oscillatable member, said pedestal element having a generally annular but distorted wall engaged by said flexible member incident to the operation of the spring and being surrounded at its base by a member presenting a generally flat surface for engagement by said flexible member near the end of the compression stroke of said piston, said surface and the distorted wall of said pedestal element co-acting to set the rate characteristics of the spring.

2. An air spring according to claim 1 where the distortion of said wall takes the form of a progressive taper, the tapering being in a direction toward said reservoir, and said member presenting a generally flat surface for engagement by said flexible member is a flange integral with the body of said pedestal element.

3. In an air spring comprising a reservoir component, a piston component including a cup element and a tubular pedestal, and a flexible member disposed between said components and engaging the outer wall of said pedestal element incident to the operation of the spring, said reservoir component being designed to telescopically receive said piston component, the latter having a static load mid-position whereat it is disposed substantially without said reservoir component, said flexible member having a pre-formed bead ring which is connected to said piston component through said cup element and tubular pedestal and a second pre-formed bead ring held in sealing engagement with the inner wall of said reservoir component by the pressure of air therewithin, the combination of a member surrounding said pedestal element at its base and presenting a generally flat surface for engagement by said flexible member near the end of the compression stroke of said piston, said spring being further characterized in that the said wall of said pedestal element is distorted to set the rate characteristics of the spring in co-action with said member presenting the generally flat surface.

4. An air spring according to claim 3 where the distortion of said wall is partial and takes the form of a progressive taper, the tapering being in a direction toward said reservoir, and said member presenting the flat surface for engagement by said flexible member is a flange integral with said pedestal element.

References Cited in the file of this patent

UNITED STATES PATENTS

| | | |
|---|---|---|
| 971,583 | Bell | Oct. 4, 1910 |
| 1,152,609 | Davis | Sept. 7, 1915 |
| 1,242,431 | Foster | Oct. 9, 1917 |